Oct. 26, 1965   L. A. HUGO   3,214,509
PROTECTIVE CAP FOR CONNECTIONS
Filed Dec. 31, 1962

INVENTOR.
L. A. HUGO
BY
Young and Quigg
ATTORNEYS

United States Patent Office 3,214,509
Patented Oct. 26, 1965

3,214,509
PROTECTIVE CAP FOR CONNECTIONS
Lester A. Hugo, Bartlesville, Okla., assignor to Phillips Petroleum Company, a corporation of Delaware
Filed Dec. 31, 1962, Ser. No. 248,415
6 Claims. (Cl. 174—84)

This invention relates to a protective cap. In one aspect this invention relates to a protective cap for covering and insulating metal to metal connections in cathodic protection systems. In another aspect this invention relates to a method and means for restoring the protective covering on a metal structure.

Various systems and methods are known in the art for protecting metal structures, such as buried pipelines, from corrosion. One such system, identified broadly as cathodic protection, mitigates electrolysis and galvanic corrosion of the pipeline by making the pipeline cathodic (negative) to the earth in which it is buried. In one system of cathodic protection, identified herein as rectifier cathodic protection, the negative polarity on the pipeline is made possible by direct current from a rectifier which generally is energized from a commercially available 60-cycle alternating current source. The negative terminal of the rectifier is connected to the pipeline, and the positive terminal of the rectifier is connected to a ground bed reference electrode system located a substantial distance from the pipeline.

In another system of cathodic protection, a protective metal of higher potential than the structure to be protected is, in effect, utilized as the source of current. When two such dissimilar metals are placed in an electrolyte (such as soil) and connected by means of an electrical conductor, a galvanic cell is created and current flows from the metal of higher potential to the metal of lower potential. In such a system, the protective metal of higher potential becomes the anode and the protective metal of lower potential becomes the cathode. In the cathodic protection of iron and steel, magnesium is commonly used as the anode metal. In such systems the anodes are placed around or along the structure to be protected in sufficient quantity and in strategic locations to protect all parts of the structure equally.

Protective coverings and/or wrappers comprising suitable insulating and water-proofing materials, such as the various bituminous protective covering materials, are more widely used than cathodic protection systems, primarily because they are usually less expensive and more readily installed. However, for maximum protection, particularly for relatively inaccessible structures such as buried pipelines, it is quite common to employ both a protective covering system and a cathodic protection system. Employing cathodic protection in combination with protective coverings has the advantage of insuring against imperfections or failures in the protective covering. In all types of cathodic protection, it is necessary to install various metal to metal connections between electrical conductors and the metal structure to be protected. With some metal structures, such as the pipe in buried pipelines, the protective covering material is usually placed on the pipe before and/or as it is being installed in the earth. The necessary metal to metal connections for cathodic protection are usually installed after the pipeline is in place because it is more convenient to do so. In the repair and maintenance of pipelines, such connections are always installed after the pipeline with its protective covering thereon is in place.

Installing such metal to metal connections after the protective covering has been placed on the pipeline creates problems because said protective covering must be opened and then restored. In the past it has been common practice to restored the protective covering by wrapping the area of the metal to metal connection with various types of tape or applying other types of covering material. In such practice great care must be taken to obtain a moisture-tight seal. When a moisture-tight seal is not obtained, there is a likelihood of galvanic action between the steel of the pipeline and the other metal in the metal to metal connection. Such methods are expensive and time consuming due to the great care required in obtaining a moisture-tight seal. Furthermore, the incidence of failures due to lack of a moisture-tight seal is too great, even when the work is carefully done by experienced personnel.

The present invention provides a means and method for solving said problems by providing a means and method for quickly and efficiently restoring the protective covering and protecting and insulating said metal to metal connection. Broadly speaking, the present invention provides an indented protective cap of a size and shape adapted to be placed in position over the metal to metal connection in a manner to form a sealing bond with said protective covering.

The method of the invention, broadly speaking, comprises placing said protective cap and an adhesive protective coating material over said metal to metal connection and pressing the cap firmly into position with the indentations therein over said connection and the periphery of said cap over the adjacent portion of the original protective covering on the structure so as to force a portion of said adhesive protective coating material into contact with said original protective covering to form a sealing bond between said cap and said original protective covering material.

Thus, an object of this invention is to provide a protective cap for covering and insulating a metal to metal connection. Another object of this invention is to provide a protective cap which can be quickly and efficiently placed in position to provide protection and insulation for a metal to metal connection between a conductor and a metal structure, such as a pipeline. Another object of this invention is to provide a fast and efficient method for restoring the protective covering material on a metal structure, which covering material has been opened to make a metal to metal connection between the metal of said structure and an electrical conductor. Other aspects, objects, and advantages of the invention will be apparent to those skilled in the art in view of this disclosure.

Thus, according to the invention, there is provided a protective cap comprising: a base; a dome extending outward from one side of said base to form a cavity in the opposite side of said base; and a semi-tubular shield extending outward from said one side of said base to provide a channel in the opposite side of said base extending from said cavity to the periphery of said base.

Further according to the invention, there is provided protection from corrosion of a metal structure covered with an original protective covering material wherein an opening is made in said covering to expose the metal of said structure, and a metal to metal connection is made between the metal of said structure and a metal conductor, the improved method of restoring said protective covering at said opening and insulating said connection, which method comprises: covering said connection and the adjacent portion of said conductor with an adhesive protective coating material and a protective cap; and applying pressure to said cap to force a portion of said adhesive coating material beyond the periphery of said cap and into contact with said original covering material to form a sealing bond between said cap and said orignal covering material.

Figure 1:
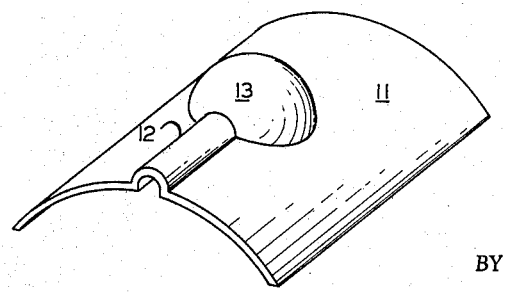
FIGURE 1 is an isometric view of one embodiment of the protective cap of the invention.

Referring now to said drawings, wherein like reference numerals are employed to denote like elements, the invention will be more fully explained. In FIGURE 1 the embodiment of the protective cap of the invention there illustrated comprises a base 11 having a generally rectangular periphery of a size and shape to surround an opening in the original protective covering on the metal structure where the protective cap is to be employed. Said base has been formed from a sheet of thermoplastic insulating material to have a concave surface and a corresponding opposite convex surface. A hemispherical dome 13 extends outward from said convex surface and forms a cavity in said concave surface. A semi-tubular shield 12 extends outward from said convex surface and provides a channel in said concave surface which extends from said cavity to the periphery of said base. While said base 11 has been illustrated as having a generally rectangular periphery, it is to be understood it is within the scope of the invention to form said base to have a periphery of any suitable size and shape, such as oval, square, or circular instead of rectangular. Also, it will be understood that said dome 13 can have any other suitable shape, such as semi-oval or semi-elliptical, instead of hemispherical. It will also be understood that said semi-tubular shield 12 can be of other suitable shapes, such as square, instead of circular as shown. Likewise, it will be understood to be within the scope of the invention for said base 11 to have flat top and bottom surfaces instead of convex and concave surfaces, respectively.

Figure 2:
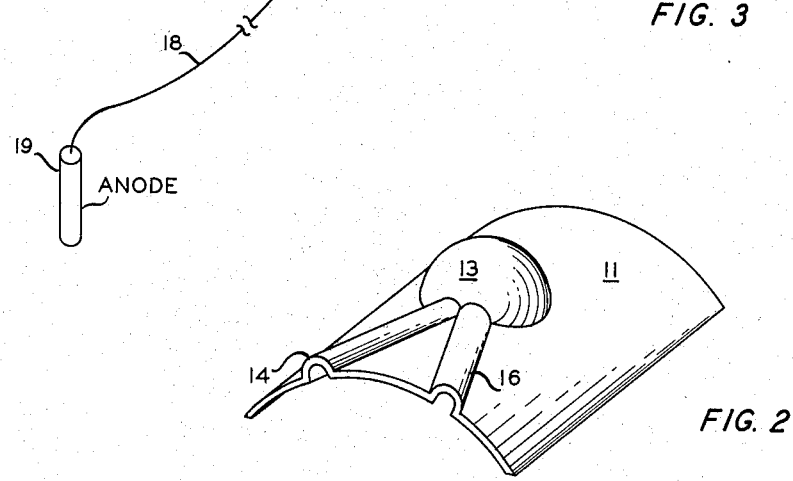
FIGURE 2 is an isometric view of another embodiment of the protective cap of the invention.

The protective cap illustrated in FIGURE 2 is like that of FIGURE 1 except that a plurality of semi-tubular shields such as 14 and 16 are provided. Each of said tubular shields provides an independent channel in the concave surface of base 11 which extends from the cavity formed in said concave surface by dome 13 to the periphery of said base 11. While the protective cap of FIGURE 2 has been illustrated as having two tubular shields 14 and 16, it will be understood it is within the scope of the invention for the cap to be provided with more than two tubular shields, such as three or four.

Figure 4:
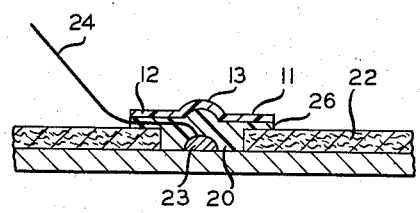
FIGURE 4 is a view in cross section through an installation wherein the metal to metal connection between an electrical conductor and the metal structure to be protected has been insulated and the protective covering material on said metal structure restored in accordance with the invention.
Figure 3:
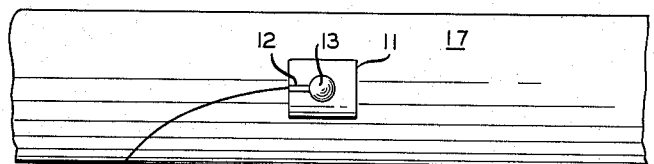
FIGURE 3 is a plan view of a section of a pipeline illustrating employing the protective cap of the invention to protect a metal to metal connection between said pipeline and an electrical conductor of a cathodic protection system.

In FIGURE 3, a protective cap like that shown in FIGURE 1 has been placed in position over an opening (not shown but like that illustrated in protective covering 22 in FIGURE 4) in protective covering 17 on a section of pipeline. Dome 13 of said cap has been placed over a metal to metal connection (not shown but like the weld 23 in FIGURE 4) between an insulated lead wire or electrical conductor 18 and the metal of the pipe. Said electrical conductor 18 extends from said connection through the channel provided by tubular shield 12 and to an anode 19 made of a suitable metal, such as magnesium.

FIGURE 4 illustrates in cross-section a completed installation in accordance with the invention. As illustrated, an opening has been made in the protective covering 22 of the metal structure. A metal to metal connection between insulated electrical conductor 24 and the metal of said structure has been provided by means of weld 23. Said weld 23 can be any suitable type of weld such as that formed by thermit welding using a suitable portable mold and apparatus. It will be understood it is within the scope of the invention to employ other means of making the metal to metal connection such as electrical welding, acetylene welding, brazing, soldering, or for that matter, screw connections between a lug formed on the metal structure and the electrical conductor.

In completing the installation shown in FIGURE 4 a number of methods can be employed. In one method, weld 23, the opening in protective covering 22, and the portion of said protective covering which is adjacent said opening are covered with an adhesive protective coating material 20. The protective cap is then placed in position with dome 13 over weld 23 and shield 12 over the portion of conductor 24 adjacent thereto, and said cap is then pressed firmly into position so as to force a portion of said adhesive protective coating material 20 beyond the periphery of said cap and thus insure contact with said protective covering material 22 and the formation of a sealing bond between said cap and said protective covering material 22. The adhesive protective coating material referred to above can be any suitable such material. One presently preferred material is a mastic material available commercially as Plicoflex No. 200 Filler Compound from Plicoflex, Inc., 2425 Mowrey Road, Houston 45, Texas. Such materials are frequently referred to as mastic materials. Any other suitable bituminous material can be used in the practice of the invention.

Although not apparent from FIGURE 4, in many instances protective covering 22 will be relatively thin and the weld 23 or other metal to metal connection will extend above said protective covering 22. This is a primary reason for providing dome 13 on the protective cap. In such instances, it is frequently more convenient to fill the indentations (the cavity formed by dome 13 and the channel formed by semi-tubular shield 12) in the protective cap with the adhesive protective coating material 20, then place said cap in position with said filled indentations therein over said metal to metal connection and the portion of conductor 24 adjacent thereto, with the periphery of said cap extending over the portion of said protective covering 22 which is adjacent the opening therein, and then pressing said cap firmly into position to force a portion of said adhesive protective coating material 20 between base 11 of the cap and said adjacent portion of protective covering 22 as indicated at 26, and preferably beyond the periphery of said base 11, to form a sealing bond between said cap and said protective covering material 22.

The protective cap of the invention can be fabricated from any suitable material. The various plastic materials possessing insulating properties are preferred materials. Presently more preferred materials are the thermoplastic materials such as polyethylene, polypropylene, copolymers of ethylene and propylene, polystyrene, polyvinylchloride, mixtures of polyethylene and polyisobutylene, mixtures of copolymers of ethylene and propylene with polyisobutylene, and the like. A particularly well suited material is black polyethylene, i.e., polyethylene containing carbon black added thereto as a pigment.

The protective cap of the invention can be formed or fabricated in any known suitable manner. When using thermoplastic materials, such methods as thermoforming (by either vacuum or pressure), blow molding, and injection molding can be utilized. It is preferred that base 11, dome 13, and the semi-tubular shields such as 12, or 14 and 16, all be formed as an integral unit. However, it will be understood it is within the scope of the invention for said base, said dome, and said tubular shields to be formed separately and the cap then assembled by cementing the dome and tubular shields to the base employing any suitable cement or adhesive.

Reference has been made herein to protective covering materials. The term "protective covering" is employed generically herein and in the claims to include materials which are applied as a coat or layer on the surface of the structure to be protected, such as a coal tar pitch, a petroleum asphalt, pressure sensitive tapes, and extruded plastic coatings, and also materials which are commercially referred to as wrapping materials and which are applied on the outside of a layer of coal tar pitch or petroleum asphalt. The term "bituminous" is employed generically to include both coal tar pitches and petroleum asphalts and also the various mastic coating materials. Thus, the combined terms "bituminous protective coating" and "bituminous protective covering" are used generically to include a protective coating or protective covering which comprises a layer of bituminous material on the pipe or other structure to be protected, or which comprises a layer of bituminous material and a layer of wrapping material such as asphalt saturated rag, asphalt saturated asbestos felt, or glass fiber mats, applied outside said bituminous layer. If desired, another layer of the bituminous material can then be added to the outside of the wrapping material and still another layer of wrapping material outside said another layer of bituminous material. Such protective coverings are well known to those skilled in the art and are widely used in the protection of pipelines, tanks, etc. Detailed specifications of materials and methods of applying same can be found in the booklet "Asphalt Protective Coatings for Pipelines" Construction Series, No. 96, published by the Asphalt Institute, 801 Second Avenue, New York, New York. Said booklet also gives specifications for petroleum asphalts suitable for use as protective coatings for pipelines or other buried objects. Specifications for suitable coal tar pitches can be found in the Booklet AWWA C203–51 published by the American Water Works Association, 521 5th Avenue, New York, New York.

As an example of the dimensions of one embodiment of the protective cap which has been fabricated and employed in accordance with the invention, and to further illustrate the invention, the following dimensions are included herein. In said embodiment, base 11 had a length of 3½ inches and a width of 3 inches. Dome 13 had a diameter of 1½ inches and a radius of curvature of ¾ inch. The radius of curvature of tubular shield 12 was ⁵⁄₁₆ inch. The radius of curvature of the concave surface of base 11 was 3 inches. The cap was fabricated as an integral unit from sheet polyethylene having a thickness of 30 mils. It is not intended that these dimensions should be limiting in any manner on the invention because all of said dimensions can be varied. It is within the scope of the invention to fabricate the protective cap of any dimensions suitable for the particular use or installation intended.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A protective cap comprising: a substantially flat base sheet; a dome extending outward from one side of said base sheet and forming a cavity in the opposite side of said base sheet; and a semi-tubular shield extending outward from said one side of said base sheet and providing a channel in the opposite side of said base sheet extending from said cavity to the periphery of said base sheet.

2. A protective cap comprising: a substantially flat base sheet; a dome extending outward from one side of said base sheet and forming a cavity in the opposite side of said base sheet; and a plurality of semi-tubular shields extending outward from said one side of said base sheet and providing a plurality of channels in said opposite side of said base sheet extending from said cavity to the periphery of said base sheet.

3. A protective cap formed as an integral unit from a substantially flat sheet of an insulating material and comprising: a base sheet having a generally rectangular periphery, a convex surface, and a concave surface; a hemispherical dome extending outward from said convex surface and forming a cavity in said concave surface; and a plurality of semi-tubular shields extending outward from said convex surface, each of said shields providing a separate channel in said concave surface extending from said cavity to the periphery of said base sheet.

4. A protective assembly comprising, in combination: a metal structure covered with a protective covering material; an opening provided in said protective covering and exposing the metal of said structure; an insulated lead wire; connection means connecting one end of said lead wire to said exposed metal of said structure; and a cap covering and protecting said connection means and the adjacent portion of said lead wire, said cap comprising: a base having a periphery of a size and shape to surround said opening in said protective covering and formed of a sheet of thermoplastic insulating material; a dome extending outward from one side of said base to form a cavity in the opposite side of said base, said dome being positioned over said connection means; a semi-tubular shield extending outward from said one side of said base and providing a channel in said opposite side of said base extending from said cavity to the periphery of said base, said channel being positioned over said portion of said lead wire adjacent said connection means; and a mastic adhesive insulating material filling said cavity and channel, surrounding said connection means and lead wire, and extending between said base and said protective covering to provide a sealing bond therebetween.

5. A protective assembly for a pipeline, comprising, in combination: a pipe covered with a protective covering material; an opening provided in said protective covering and exposing the metal of said pipe; an elongated insulated lead wire; connection means connecting one end of said lead wire to said exposed metal of said pipe; and a cap covering and protecting said connection means and the adjacent portion of said lead wire, said cap comprising: a base having a periphery of a size and shape to surround said opening in said protective covering, and formed from a sheet of thermoplastic insulating material to have a concave surface and a corresponding opposite convex surface; a hemispherical dome extending outward from said convex surface and forming a cavity in said concave surface, said dome being positioned over said connection means; a semi-tubular shield extending outward from said convex surface and providing a channel in said concave surface extending from said cavity to the periphery of said base, said channel being positioned over said portion of said lead wire adjacent said connection means; and a mastic adhesive insulating material filling said cavity and channel, surrounding said connection means and lead wire, and extending between said base and said protective covering to provide a sealing bond therebetween.

6. A protective cap formed as an integral unit from a substantially flat sheet of an insulating material, and comprising: a base sheet having a convex surface and an opposite concave surface; a hemispherical dome formed in said sheet and extending outward from said convex surface and forming a corresponding cavity in said concave surface; and a semi-tubular shield formed in said sheet and extending outward from said convex surface and providing a corresponding channel in said concave surface which communicates with and extends from said cavity to the periphery of said sheet.

References Cited by the Examiner

UNITED STATES PATENTS 2,317,088  4/43  Salisbury _____ 174—5

LARAMIE E. ASKIN, *Primary Examiner.*

JOHN P. WILDMAN, *Examiner.*